*INVENTOR.*
ROBERT M. HOHENSTEIN
BY Karl A. Ohralik

ATTORNEY

INVENTOR.
ROBERT M. HOHENSTEIN
BY Karl A. Ohralik
ATTORNEY

United States Patent Office 3,446,079
Patented May 27, 1969

3,446,079
LINEAR ELECTROSTATIC ACCELEROMETER
Robert M. Hohenstein, Glen Ridge, N.J., assignor to Singer General Precision Inc., a corporation of Delaware
Filed July 17, 1967, Ser. No. 653,939
Int. Cl. G01p *15/08*
U.S. Cl. 73—517                     12 Claims

ABSTRACT OF THE DISCLOSURE

An accelerometer comprises a proof mass within an enclosure and movable along an acceleration axis in relation to the enclosure. The proof mass in conductive and is maintained in transverse position relative to the enclosure by rings of liquid such as mercury interposed between the proof mass and the enclosure. The mercury serves to provide a low friction support for the proof mass. Rings of dielectric material of different dielectric constants cover the surface of the proof mass and thus, the conductive mercury and proof mass being separated by the dielectric material form force balancing capacitors along the axial extent of the mercury rings, dielectric material of different constants cover the proof mass. A portion of the proof mass in movement along its acceleration axis is differentially spaced from two conductive plates on the housing serving to provide a pair of pickoff capacitors connectable as legs in a bridge circuit effective to provide a pickoff potential proportional to mass displacement. For restoring the proof mass to a null position, the force balancing capacitors established by the proof mass and mercury rings separated by dielectric materials are responsive to potentials derived from the capacitive pickoff to produce forces on the proof mass in a direction opposite to its displacement due to acceleration.

Background of the invention

This invention relates to inertial apparatus and more particularly to an accelerometer utilizing a proof mass responsive to acceleration thereof to produce forces indicative of the acceleration magnitude.

In present-day navigation systems for aircraft and missiles, the inertial accelerometer assumes a significant role. Of course, it is desirable that all components of such systems be light, small and compact without sacrifice of the desirable factors and thus, these qualities are equally desired in accelerometers. In force balance accelerometers wherein a proof mass is displaced in response to an acceleration and wherein components are provided for applying forces to restore the proof mass to its initial or null position, frequently such components comprise relatively expensive, complex, heavy, and bulky elements.

In accordance with this invention, force balancing is effectively and simply provided by restoring forces produced by a novel construction of the accelerometer wherein components are small and light and wherein some components serve dual purposes. A proof mass in the form of a cylindrical, conductive shell is contained within an enclosure which supports interior rings of conductive fluid such as mercury. The mercury serves to maintain the proof mass in a relative spaced position transverse with respect to the enclosure while providing low friction to movement of the proof mass along the acceleration axis relative to the enclosure. The surfaces of the proof mass nearest to the conductive fluids are coated with dielectric materials of different dielectric constants forming effective capacitors. By proper positioning of axial lengths of the dielectric materials relative to the conductive fluids so as to establish an axial overlap thereof, in response to displacement of the proof mass form a null position, axially directed forces may be electrostatically applied to the proof mass by the application of electrical potential between the conductive proof mass and the conductive fluid to accomplish the force balancing. Thus, capacitors in an electrical bridge circuit and which are differentially variable in response to axial movement of the proof mass may provide pickoff potentials useful to provide the force balancing and output potentials and force balancing may be achieved by a simple, compact effective construction unitary with the accelerometer.

Figure 1:
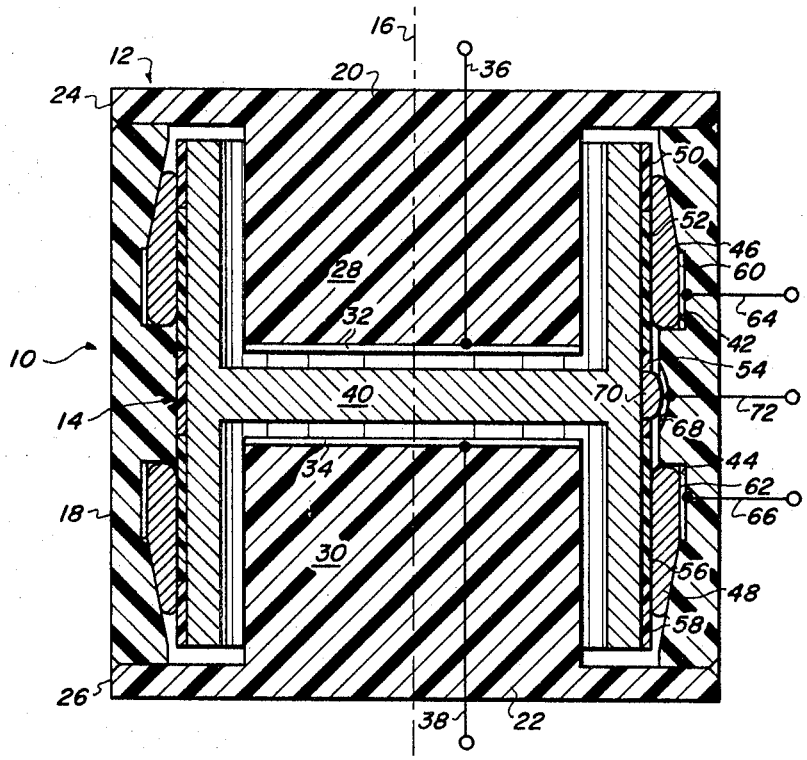
FIGURE 1 is a greatly enlarged cross-sectional view of a preferred embodiment of accelerometer according to this invention.

Referring to the drawings for a detailed description of the invention, in FIGURE 1, 10 represents an accelerometer according to this invention and comprising an enclosure 12 in which is contained a proof mass 14 movable relative to the enclosure along a direction parallel to an acceleration axis 16. The enclosure 12 comprises a nonconductive, generally tubular-shaped, section 18 and being closed at respective ends by nonconductive, flanged plug members 20 and 22. The flanges 24 and 26 of these members are secured to section 18 in any suitable manner to provide a hermetic seal and the plug portions 28 and 30 of these members protrude inwardly into section 18. To establish capacitors for pickoff purposes, plugs 28 and 30 are provided with flat conductive plates 32 and 34 and electrical connection to these respective plates is enabled by leads 36 and 38 extending through the plug members 20 and 22 exteriorly of the accelerometer. These plates and a portion of proof mass 14 form capacitors differentially variable in response to relative movement of the proof mass. While the section 18 is shown as being in the shape of a hollow, right-circular cylinder, it may also be a cylinder of other than circular cross section in a plane perpendicular to axis 16.

Proof mass 14 is made of conductive material such as aluminum and has a circular outer periphery complementary to the inner surface of section 18. In cases wherein section 18 may be of a configuration other than circular, the outer periphery of proof mass 14 is made to conform to such contour. The tubular proof mass 14 is provided with a septum 40 which in the movement of the proof mass along axis 16 relative to enclosure 12, differentially varies the spacing between this septum and plates 32 and 34 whereby the capacitance of these capacitors is also differentially varied.

In accordance with novel features of this invention, proof mass 14 is supported by means imposing virtually no static friction on the proof mass and which is useful in cooperation with dielectric means to effect the restoration of proof mass 14 to an initial or null position by electrostatic forces. To this end, tubular section 18 is internally, circumferentially recessed at 42 and 44 and rings of conductive fluid 46 and 48, such as mercury, are disposed in these recesses. To allow for expansion or contraction due to changes in temperature, the recesses are axially tapered as shown. The periphery of proof mass 14 is covered with rings of dielectric material 50, 52, 54, 56 and 58. Rings 50, 54 and 58 are of a relatively low dielectric constant preferably a constant as near to unity as possible whereas rings 52 and 56 are of a relatively high dielectric constant. These may be compositions of barium titanate with quantities of materials such as calcium zirconate although other dielectrics with high dielectric constants of the order of 10,000 are also contemplated. As shown, dielectric rings 50 and 52 are in direct contact with fluid ring 46 and dielectric rings 56 and 58 are in direct contact with fluid ring 48. In the sizes of accelerometers constructed in accordance with this invention, i.e., wherein height and diameter as shown in FIGURE 1 are of the order of one-fourth inch each, the surface tension of mercury is sufficiently great to maintain the mercury in position even in accelerations of many times gravity and yet maintain the relative transverse positions of proof mass 14 and enclosure 12. Also, in this construction wherein fluid rings 46 and 48 are a newtonian fluid such as mercury, that is, presenting virtually no static friction to movement by the dielectric surfaces abutting the fluid and low dynamic friction, an increased accuracy and performance is imparted to the accelerometer.

As noted hereinabove, the conductive fluid ring 46 and near periphery of proof mass 14 are separated by dielectric materials thus forming an electrical capacitor. Similarly, fluid ring 48 and proof mass 14 form another capacitor. For applying electrical potentials to rings 46 and 48, a pair of metallic electrodes or rings 60 and 62 are disposed in the bottoms of recesses 42 and 44 so as to be in direct contact with liquid rings 46 and 48 and electrical leads 64 and 66 extend from these electrodes through the enclosure 12, exteriorly thereof. Also, for making an electrical connection to proof mass 14, an electrode 68 is provided in a recess in the interior wall of enclosure 12 and a drop of conductive liquid 70 such as mercury is disposed in this recess. A portion of dielectric ring 54 is removed to facilitate direct contact between drop 70 and proof mass 14. Exterior electrical connections to electrode 68 are made through an electrical lead 72 extending from this electrode through enclosure 12 exteriorly thereof.

In the accelerometer 10, the liquid rings 46 and 48 are proportioned so as to provide lateral support for proof mass 14 and maintain a clearance between the proof mass and the interior of enclosure 12. The liquid rings possess sufficient surface tension to prevent leakage of the liquid from the respective recesses even under very high accelerations and by the nature of the liquid rings they impose virtually no static friction or resistance to movement by the proof mass along its axial direction relative to enclosure 12. The dynamic or moving friction between the proof mass 14 and the liquid rings is a function of the relative velocity between these members but is also very low.

Figure 3:
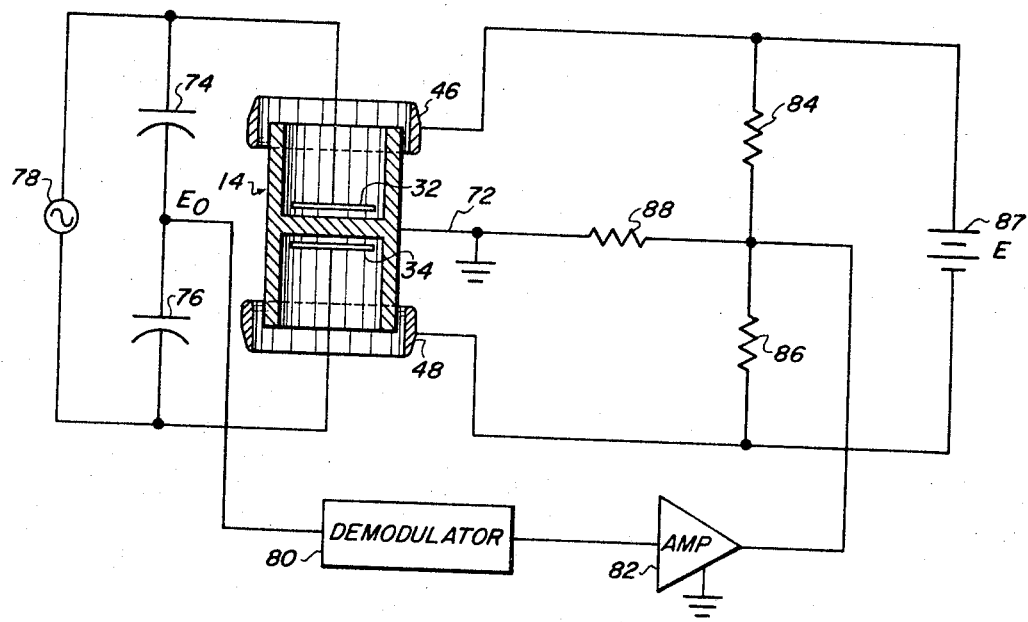
FIGURE 3 is a schematic representation of the accelerometer shown in FIGURE 1 together with electrical circuitry providing acceleration sensing and force balancing in an accelerometer system; and, FIGURE 4 is a graph illustrating the force versus electrical drive potential characteristic of an accelerometer according to this invention.

For a better understanding of this invention and the manner in which it is incorporated in an accelerometer system, reference is made to FIGURE 3 of the drawings. In this figure, accelerometer 10 is represented schematically by showing only the critical parts including proof mass 14, liquid rings 46 and 48, plates 32 and 34 and conductive leads to these components. In addition, circuitry for aiding in sensing acceleration and for restoring proof mass 14 to null position, is shown.

Proof mass 14 is grounded through lead 72. The electrical capacitors formed by septum 40 of proof mass 14 and plates 32 and 34 are connected as capacitive legs of an electrical bridge circuit including additional capacitors 74 and 76 serially interconnected and, as a pair, connected in parallel with plates 32 and 34. Suitable electrical excitation in the form of an alternating potential is supplied by a source 78 connected across pairs of capacitors 74 and 76 and 32–40 and 34–40. Capacitors 74 and 76 are preferably of equal capacitance and the null position of proof mass 14 is the position wherein septum 40 is equidistantly spaced from plates 32 and 34 whereby capacitors 32–40 and 34–40 are initially also equal to each other. Thus, in the null position of proof mass 14, the output potential $E_o$ of the bridge circuit taken between junctions of the two sets of serially connected capacitors is substantially zero. Any displacement of the proof mass 14 from the null position, however, results in an output potential, either positive or negative, depending upon the direction of displacement from null.

Figure 2:
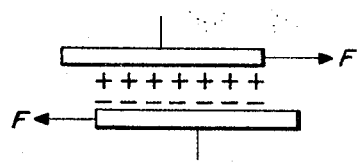
FIGURE 2 illustrates offset capacitor plates and forces applied thereto in response to the application of charge to the plates.

For an understanding of the force balancing aspect of this invention, it is noted that it is a well-known scientific fact that physical systems tend to assume conditions or states of lowest potential energy. Thus, if a capacitor is electrically charged and its equal sized plates are displaced laterally relative each other as shown in FIGURE 2 of the drawing, the potential energy of the capacitor is increased whereby a force, F, exists tending to bring the projections of the plates into congruency, thus to assume a condition of lower potential energy. Similarly, in the space between capacitor plates is occupied along different portions by dielectric of different constant, the lateral force on the plates is such as to tend to bring the plates into a position wherein the capacitor has the lowest potential energy or in other words, with the low dielectric constant material between plates.

To produce force balancing or to restore the proof mass 14 to its initial position in FIGURE 3 of the drawings, the output potential $E_o$ is demodulated by a demodulator circuit 80 of any suitable type, amplified to an appropriate value by an amplifier 82 and combined with bias potentials for application to the liquid rings 46 and 48. The rings 46 and 48 are connected directly to respective positive and negative terminals of a direct potential source 87 having a potential E. A potential divider comprising a pair of resistors 84 and 86 serially connected, is connected across direct potential source 87 and the midpoint of this potential divided is connected through a resistor 88 to ground. Thus, in the null position of proof mass 14, liquid rings 46 and 48 have applied thereto respective potentials $+E/2$ and $-E/2$. In a position of proof mass 14 displaced from null, amplifier 82 applies an output potential proportional to this displacement and of a polarity corresponding to the direction of displacement, The output potential of amplifier 82 is effective to increase the potential applied to one of the liquid rings and to reduce the potential applied to the other liquid ring. Thus, in the displaced position shown in FIGURE 3, the output potential of amplifier 82 would be of negative polarity, increasing the potential applied to liquid ring 46 and reducing the potential applied to liquid ring 48. In this case, the electrostatic forces of the capacitor formed by the proof mass 14 and ring 46 are increased and in a direction to restore the proof mass to a null position.

Figure 4:
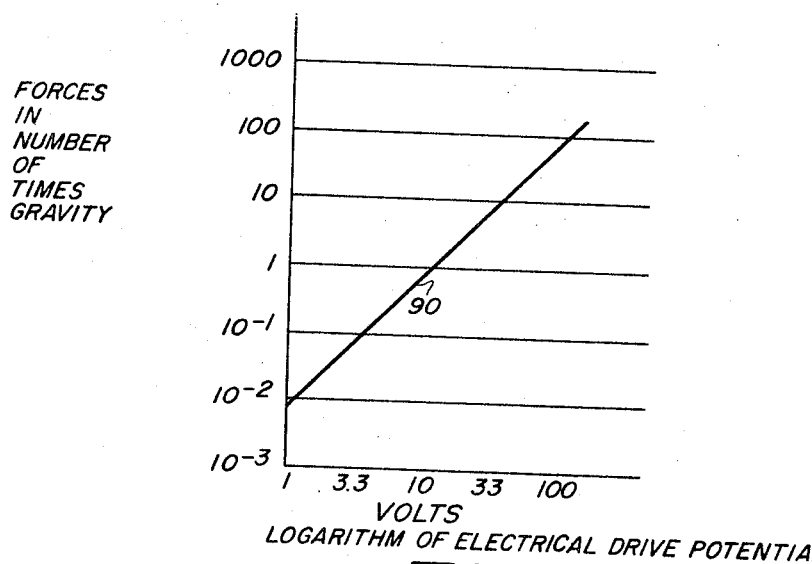

From the foregoing description, it is clear that a novel, improved force balance accelerometer is provided according to this invention wherein the balance force producing means is simple, small, light, and effective to produce strong balancing forces. It should be noted that with a proof mass less than one-fourth inch in height and less than one-fourth inch in diameter it is possible to produce force of 100 times gravity on the proof mass with the application of 100 volts of electrical control potential. This is graphically illustrated in FIGURE 4 wherein the straight line 90 shows the force versus electrical drive potential characteristic of a specific embodiment of accelerometer.

In more common terms, a force balance accelerometer according to this invention having the proportions described hereinabove, viz, one-fourth inch high by one-fourth inch in diameter and with a proof mass weighing approximately three thousandths of an ounce, is responsive to the application of an electrical control potential of 100 volts to apply a restoring force of 260 thousandths of an ounce to the proof mass. Under these conditions, the force of $260/3 = 86$ times gravity is developed.

While the present invention has been described in a preferred embodiment, it will be obvious to those skilled in the art that various modifications can be made therein within the scope of the invention, and it is intended that the appended claims cover all such modifications.

What is claimed is:

1. An accelerometer having an acceleration axis and comprising an enclosure having a cylindrical interior with conductive members along axially spaced portions thereof; a proof mass having conductive, peripheral portions with axial lengths axially coextensive with respective ones of said conductive members insulating means interposed between each conductive member and said proof mass to thereby effectively form respective electrical capacitors wherein said conductive elements form effective capacitive electrodes and said insulators form the dielectric elements between the effective electrodes; said insulating means having lengths with different dielectric constants whereby the capacitance of effective capacitors along said respective lengths are different, an additional conductive element interiorly of said enclosure uniformly spaced over its area from a surface of said proof mass to effectively form an additional capacitor wherein said additional conductive element effectively forms a capacitor electrode and a surface of said proof mass effectively forms the other electrode of said additional capacitor, said proof mass being movable along its axis to differentially alter the last mentioned spacing to effectively alter the capacitance of the additional capacitor, and means establishing electrical connections between each of said proof mass, conductive members and conductive element and terminals exterior to said accelerometer.

2. An accelerometer having an acceleration axis comprising an enclosure of nonconductive material having a cylindrical interior; a proof mass within said enclosure having a conductive surface with insluating material secured thereto with axially spaced portions of different dielectric constant, conductive means immovable relative to said enclosure and being in contact with said insulating means along both of said axially spaced portions to effectively form a first electrical capacitor wherein said conductive surface of said proof mass and said conductive means form effective capacitor electrodes of said capacitor, and said insulating material forms the dielectric between said electrodes, a conductive element on said enclosure and being substantially in a plane having a component substantially perpendicular to said axis and a conductive surface of said proof mass facing said conductive element of said enclosure to form a second capacitor variable in capacitance with movement of said proof mass along said axis relative to said enclosure, and means for establishing electrical connections between each of said proof mass, said conductive means and said conductive element and external terminals.

3. An accelerometer according to claim 2 wherein said conductive means comprise rings of conductive liquid of high surface tension.

4. An accelerometer according to claim 2 wherein said conductive means comprise rings of mercury.

5. An accelerometer according to claim 2 wherein said conductive means comprise rings of mercury and wherein said insulating material comprises a first ring of relatively low dielectric constant and a second ring of relatively high dielectric constant.

6. A proof mass for an electrostatic accelerometer comprising a hollow, conductive member having an acceleration axis and a web portion within said member transverse to said axis and secured to the interior thereof, said member further having a pair of axially spaced conductive surface portions, insulating material secured to each of said surface portions, and having portions of different dielectric constant.

7. A proof mass according to claim 6 wherein the conductive surfaces of said member are right-circular cylinders and said portions of dielectric material secured to each surface comprise two portions axially spaced along said surface.

8. A proof mass according to claim 7 wherein the dielectric materials secured to said respective surfaces comprise materials of one dielectric constant at axially remote locations and dielectric materials of another dielectric constant at axial locations between said materials of one dielectric constant.

9. A proof mass according to claim 8 wherein said axially remote dielectric materials are of a dielectric constant lower than said dielectric materials between said axially remote materials.

10. An apparatus having an acceleration axis comprising an enclosure having circular interior surfaces, said surfaces being recessed and liquid conductive means disposed in said recesses, a proof mass having conductive peripheral portions and insulating means having axially spaced portions of different dielectric constant secured to each peripheral portion of said proof mass, the insulating means of each peripheral portion of said proof mass being in contact with said liquid conductive means to form a first pair of capacitors each having said respective conductive peripheral portions and respective liquid conductive means as electrodes, said enclosure having conductive flat surface portions perpendicular to said axis and said proof mass having a pair of flat surface portions each facing one of said flat surface portions of said enclosure to form a second pair of electrical capacitors, whereby acceleration of said accelerometer along said axis is effective to differentially change the capacitance of each of said capacitors of said second pair to facilitate sensing of the movement of said proof mass and electrostatic force produced by said first pair of capacitors in response to the differential application of electrical potential thereacross is effective to urge said proof mass in a direction opposite to its displacement from an initial position.

11. An apparatus according to claim 10 additionally comprising a third pair of electrical capacitors, means interconnecting said second and third pairs of capacitors in an electrical bridge circuit wherein each capacitor forms one leg of said bridge circuit, means for detecting an unbalanced condition of said bridge circuit in response to electrical excitation thereof and for producing an electrical signal proportional to the magnitude of unbalance, and means for applying said signal to differentially alter the potentials applied to said liquid conductors of said first pair of capacitors.

12. An enclosure for an accelerometer having an axis and comprising a nonconductive, hollow, enclosure member having a pair of axially spaced end walls, each of said end walls including a respective plug member of lesser cross section than the interior of said enclosure for axially projecting into said enclosure to form an annular hollow with a space extending from any side of the hollow to the other side at a location axially intermediate to its ends, an annular recess in the wall of said hollow, conductive means disposed in said recess and at the inner end of one of said plugs, and means for establishing electrical connections from said conductive means to terminals exterior to said enclosure member.

References Cited

UNITED STATES PATENTS 2,978,638    4/1961    Wing et al. _____ 73—517 XR

RICHARD C. QUEISSER, *Primary Examiner.*

JOHN R. FLANAGAN, *Assistant Examiner.*